United States Patent [19]

O'Callaghan

[11] 4,094,485
[45] June 13, 1978

[54] RADIO MOUNTING BRACKET

[75] Inventor: James S. O'Callaghan, Gilford, N.H.

[73] Assignee: Tram/Diamond Corporation, Winnisquam, N.H.

[21] Appl. No.: 810,031

[22] Filed: Jun. 27, 1977

Related U.S. Application Data

[63] Continuation-in-part of Ser. No. 709,228, Jul. 27, 1976, Pat. No. 4,042,201.

[51] Int. Cl.² .............................................. B60R 11/02
[52] U.S. Cl. .................................. 248/221.3; 211/192; 248/203; 248/309 R; 292/87
[58] Field of Search ................... 248/300, 309 R, 317, 248/200, 203, 221.3, 222.1, 223.1, 243; 211/192; 292/87

[56] References Cited

U.S. PATENT DOCUMENTS

| | | | |
|---|---|---|---|
| 3,055,462 | 9/1962 | Steele | 248/243 |
| 3,190,604 | 6/1965 | Jorgensen et al. | 248/317 |
| 3,410,122 | 11/1968 | Moses | 248/203 |
| 4,020,951 | 5/1977 | Wurthner | 248/222.1 |
| 4,042,201 | 8/1977 | O'Callaghan | 248/309 R |

FOREIGN PATENT DOCUMENTS

| | | | |
|---|---|---|---|
| 1,135,711 | 12/1956 | France | 248/309 R |
| 1,129,572 | 5/1962 | Germany | 248/309 R |

Primary Examiner—Marion Parsons, Jr.
Attorney, Agent, or Firm—Thomas N. Tarrant

[57] ABSTRACT

A bracket for mounting mobile electronic equipment having L-shaped slots for receiving mounting studs attached to the equipment and wire spring elements across one or more of the slots for latching the studs into the "feet" of the L-shaped slots.

8 Claims, 3 Drawing Figures

RADIO MOUNTING BRACKET

CROSS REFERENCE TO RELATED APPLICATIONS

The present application is a continuation-in-part of my prior pending application Ser. No. 709,228, filed July 27, 1976, now U.S. Pat. No. 4,042,201 entitled RADIO MOUNTING BRACKET.

BACKGROUND OF THE INVENTION

1. Field of the Invention

The present invention relates to brackets for removably securing mobile radio units and related equipment in place on car, boat, truck or other mobile carrier.

2. Description of the Prior Art

Nonfactory installed radio equipment is commonly mounted by a bracket installed under the instrument panel of a vehicle. Various devices and arrangements have been utilized to secure the equipment unit to the bracket. The most common are probably machine screws or screw threaded bolts with various heads or knobs for tightening and loosening. Key-locking arrangements and burglar alarm connections have also been devised to reduce theft. Brackets for ready removal and insertion have been provided with slide tracks and a flat spring latching member. For removal, the latching member must be elevated or depressed as the case may be.

SUMMARY OF THE INVENTION

Now, in accordance with the present invention, a mobile equipment support bracket is provided that releasably secures an equipment unit in L-shaped slots. A plurality of L-shaped slots receive studs projecting from the radio unit. The studs are supported in the bracket upon passing around the corner into the "foot" of the "L". A wire spring secured at one end is positioned so that the other end blocks the "leg" of the "L". When the studs of the radio unit are pressed up into the foot of the "L", the spring is forced up and then snaps back securing the studs in place. The spring is supported in position by flaps stamped out of the bracket material. Two or more slots may be used with up to as many springs as slots. The present invention provides easy and quick in-and-out mounting of a radio unit without risk of jamming in slide tracks or the need to operate a release lever or screw device.

Further objects and features of the invention will become apparent upon reading the following description together with the Drawing.

DESCRIPTION OF THE PREFERRED EMBODIMENT

A unit of equipment as described herein is a radio receiver, radio transmitter or transciver for mobile use in a vehicle, tape player, recorder or other related electronic equipment for mounting in a vehicle.

A common way of installing such units is by fastening a U-shaped bracket to the vehicle by screws or nuts and bolts. The unit is then secured within the bracket by various and numerous fastening means. These fastening means are usually located at the uprights of the U-shaped bracket.

Figure 1:
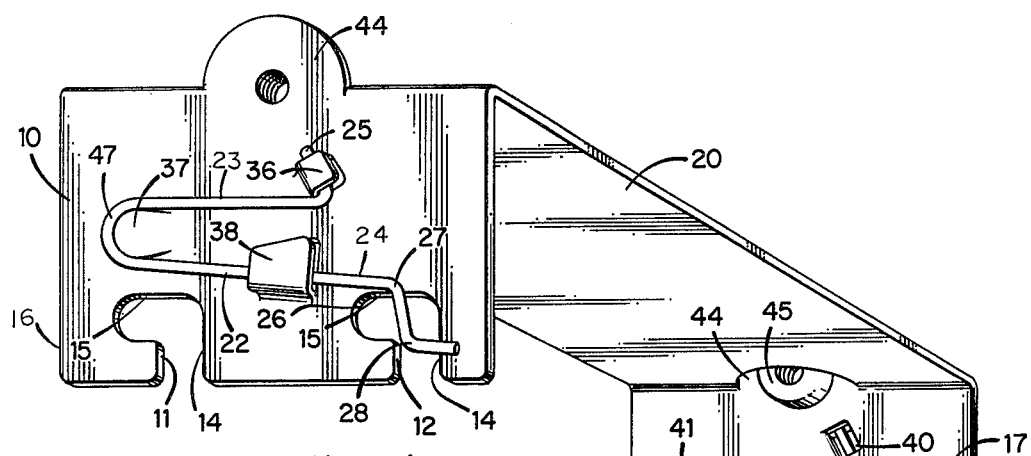
FIG. 1 is a left perspective view of a bracket according to the invention.
Figure 2:
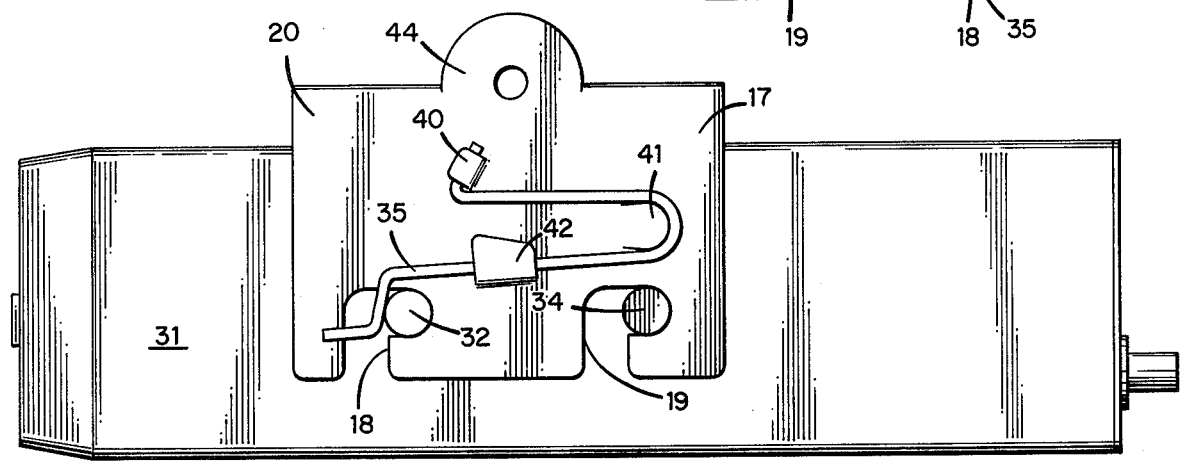
FIG. 2 is a right side elevation of the bracket of FIG. 1 supporting a radio unit.
Figure 3:
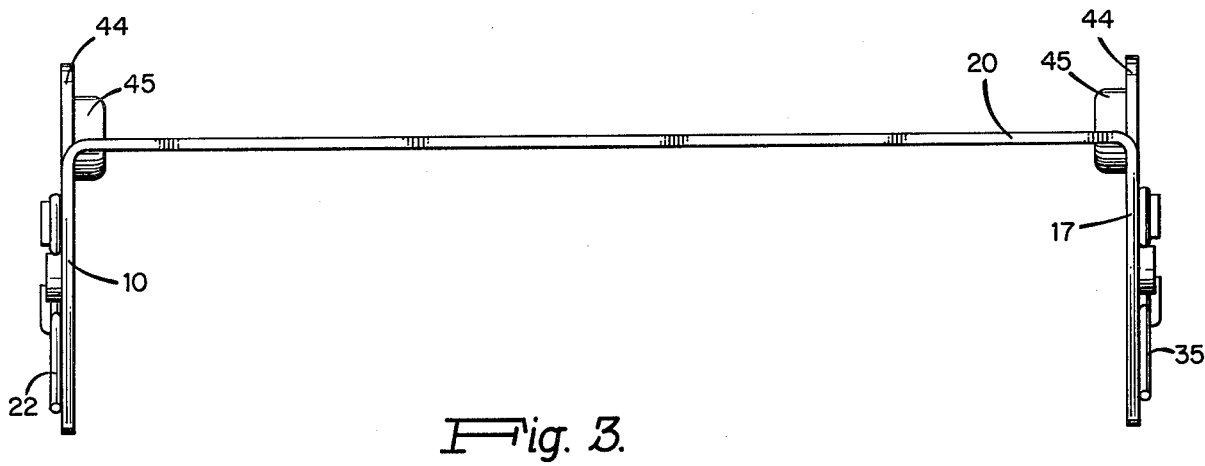
FIG. 3 is a front elevation of the bracket of FIG. 1.

Referring to FIG. 1, upright end 10 of such a bracket is depicted. Although they may be mounted in different positions, the most common way of mounting these brackets is with the uprights of the U-shape directed downward in an inverted "U" configuration. Thus, end 10 is directed downward and carries slots 11 and 12 directed upward from the bottom edge. Slots 11 and 12 each have an inverted "L" shape in which the leg 14 of the "L" is depicted vertical and foot 15 at the top of leg 14 is directed horizontally toward back 16 of bracket end 10. As depicted in FIG. 2, opposite bracket end 17 contains corresponding slots 18 and 19. FIG. 3 depicts bracket ends 10 and 17 connected in a "U" configuration to bracket 20.

Referring again to FIG. 1, spring 22 is mounted on end 10 by punched tabs 36, 37 and 38, punched from the material of bracket end 10. Spring 22 is bent in semicircle 47 and held by tab 37 above slot 11 with its two arms extending toward the front of bracket 20. Upper arm 23 of spring 22 extends horizontally to a position above and between slots 11 and 12 where end 25 of arm 23 is bent upward and backward about tab 36. Lower arm 24 of spring 22 extends in a straight line past toe 26 of foot 15 in slot 12 at which point it is bent with two reversing bends. First bend 27 is at the top of slot 12, and second bend 28 is proximate the right angle formed by leg 14 and foot 15 of slot 12. Lower arm 24 then extends substantially parallel with its original line of direction from tab 37 to extend across leg 14 of slot 12.

Tab 38 punched from bracket end 10 bears upward against spring 22 to the right of tab 37.

Referring now to FIG. 2, a unit 31 of radio equipment is depicted mounted in bracket 20. The right side end 17 of bracket 20 is shown with studs 32 and 34 of unit 31 secured in slots 18 and 19 respectively. Spring 35, similar to spring 22, bears against stud 32 securing unit 31 against easy removal. Entire bracket 20 with ends 10 and 17 and springs 22 and 35 is depicted in FIG. 3. The radio equipment to be installed is mounted between the two ends 10 and 17.

Of particular significance is the angle in bend 27 as depicted in FIG. 1. This angle affects the leverage against spring 22. In moving a stud such as 32 into slot 12, there is considerable leverage determined by the distance from tab 37 acting as a fulcrum. The greater this distance is, the easier it is to force the spring upward. However, once a stud such as stud 32 has been latched into toe 26 of slot 12, there is a different leverage for removal. This new leverage is related to the angle of bend at bend 27. As that portion of spring 22 passing around the stud approaches a right angle to the portion of spring 22 extending from tab 37, the pressure required to move the stud back out of toe 26 becomes greater and greater. In this manner insertion of a radio unit can be made relatively easy and removal relatively difficult.

In an exemplary embodiment, wire 22 was music wire having a diameter of approximately 0.18 cm and an overall length of 12 cm. The length of spring 22 between bends 27 and 28 was approximately 1.1 cm and the length from tab 37 to bend 27 was 5.0 cm. Tab 36 was positioned 3.5 cm from tab 37 and tab 37 was positioned 1.0 cm above foot 15 of slot 11. Bend 27 formed an angle of approximately 105° with the portion of spring 22 extending from Tab 37 and bend 28 bends spring 22 back with a similar angle.

In one contemplated variation, increased latching effect is achieved by curving that portion of spring 22 between bends 27 and 28. The curve would be designed to hook about the respective stud.

While the invention has been described with respect to a specific embodiment, obvious variations are contemplated, and it is intended to cover the invention within the scope of the appended claims.

I claim:

1. A bracket for mounting electronic equipment in a vehicle comprising:
    (a) a U-shaped bracket having a first slot and a second slot in each upright of the "U" for receiving mounting studs attached to opposite sides of an equipment unit, each slots having an entrance at one end of an entrance leg and a foot formed substantially perpendicular to the other end of said leg so as to form an "L" shape;
    (b) at least one wire spring element bent in a semicircle at a first punched tab in a respective said upright having an upper arm extending to a second bend about a second punched tab and having a lower arm extending through a double bend to block said first slot; and,
    (c) a third punched tab providing upward support for said lower arm; all whereby said spring element resists passage of equipment mounting studs into said first slot and then snaps behind it as it moves into the foot of the first slot to secure said equipment unit in place.

2. A bracket according to claim 1 wherein said first punched tab is located above said second slot, said second punched tab is located above a position between said first slot and said second slot and said third punched tab is located below said second punched tab.

3. A bracket according to claim 2 wherein said double bend comprises a first bend of substantially 105° with the preceding portion of said element extending from said first tab and a second bend of substantially 105° with the following portion of said element at the end opposite said first tab.

4. A bracket according to claim 3 wherein said first bend is displaced from said second bend by substantially the width of said foot.

5. A bracket according to claim 3 wherein said following portion of said element is substantially parallel with said preceding portion.

6. A bracket according to claim 1 wherein said element is made of music wire approximately 0.18 cm in diameter and 12 cm long.

7. A bracket according to claim 1 wherein said bracket is made of sheet metal and said first, second and third punched tabs are all punched from the sheet metal of said bracket.

8. A bracket according to claim 1 wherein the foot of each slot ends in a toe, said second end comprises a first element portion between the bends of said double bend and a second element portion following said double bend, said first element portion normally positioned to block the toe of said first slot and the second element portion normally positioned to block the entrance to said first slot.

* * * * *